Oct. 25, 1932.   G. E. THIMMES   1,884,382
SWITCH
Filed Feb. 9, 1928

Inventor
G. E. Thimmes
By Mawhinney & Mawhinney
Attorneys

Patented Oct. 25, 1932

1,884,382

UNITED STATES PATENT OFFICE

GEORGE E. THIMMES, OF MECHANICSVILLE, IOWA

SWITCH

Application filed February 9, 1928. Serial No. 253,017.

The present invention relates to improvements in switches, and has for an object to provide an improved type of switch which may be used to close signal circuits of motor vehicles and the like, and in which the lever or control member may be mounted adjacent the steering wheel in a position favorable to its operation by the fingers of the operator without releasing his grasp upon the vehicle steering wheel.

Other objects of the invention are to provide an improved support for the control member and to so associate the control member with the switch that, when moved in one direction, it will close the circuit through the signal but fail to remain in this position except when manually held, and when moved in the opposite direction will also close the circuit through the switch and remain in this position unaided until subsequently shifted manually back to the intermediate neutral position.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a fragmentary side view, with parts broken away and parts shown in section, of a vehicle equipped with the improved signal arrangement.

Figure 2 shows a circuit diagram with parts in section.

Figure 3 is an enlarged longitudinal sectional view taken through the switch mechanism and its support, and Figure 4 is a still further enlarged view of the switch mechanism and control member shown in longitudinal section.

Figure 1:
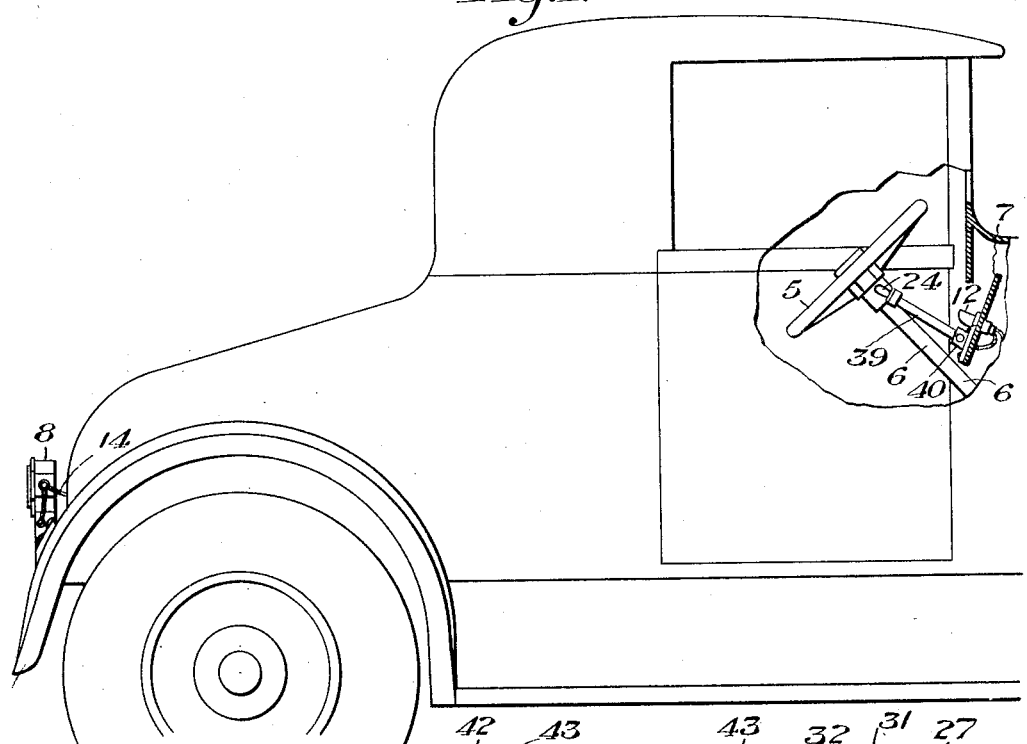
Figure 1:
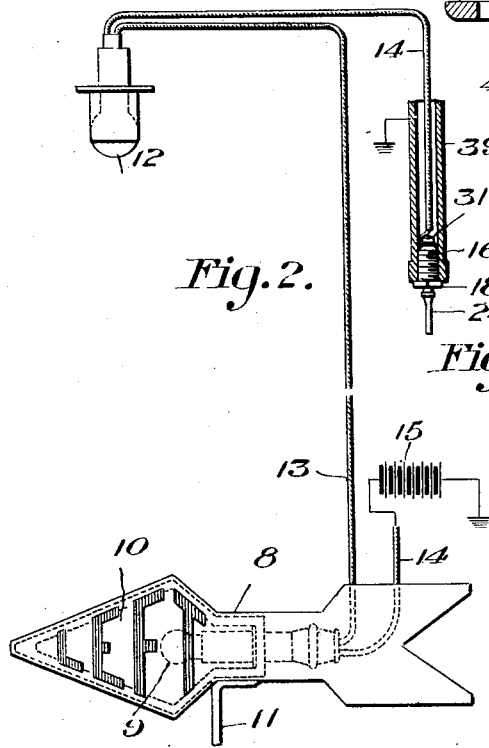
Figure 1:
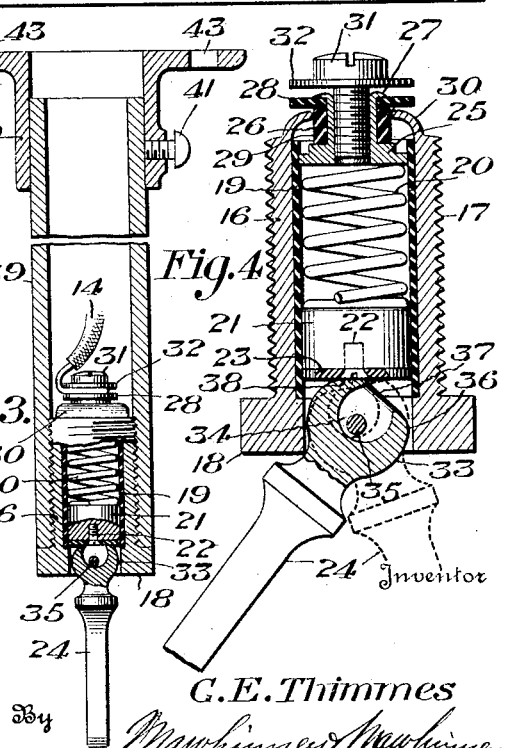

Referring more particularly to the drawing, in Figure 1 is indicated in outline a vehicle having a steering wheel 5, the usual steering post 6, and the instrument board 7.

At the rear of the vehicle is shown the signal device 8, which may take any appropriate form, for instance the form shown in Figure 2, in which the outline of the casing of the device resembles an arrow and is disposed to point toward the left when viewed from the rear of the vehicle. Within the signal device 8 is a lamp 9 disposed to show through a panel 10 or through the letters produced upon the panel. As shown in Figure 2, these letters form the word "Left". The signal device is held to the vehicle as to the fender or other appropriate part by a bracket indicated at 11.

A tell-tale lamp 12 is disposed upon the instrument board 7 and is in series with the signal lamp 9 through a circuit 13, 14 which includes the battery 15 of the automobile or other appropriate source of current. This circuit may be grounded through the frame of the vehicle as commonly done in automobile practice.

The circuit is normally opened and is arranged to be closed selectively by a switch. The switch assembly is contained within the shell or casing 16 resembling a cartridge and having external screw threads 17 and a flange or enlarged head 18. Within the casing is an insulating sleeve 19 and within the sleeve is disposed a coil spring 20 and a plunger 21 having affixed thereto as by the screw 22 or other fastening an insulating disc 23, the head of the screw being flush in the disc and exposed for contact with the control member indicated at 24. The spring 20 bears at one end against the plunger 21 and at the other end against a fixed head 25 having a tubular internally threaded shank 26 and over-turned outer ends 27 upon the flange 28 of an insulating sleeve 29, which extends about the shank 26 and is gripped by the inturned end 30 of the shell. The binding post 31 takes into the shank 26 and is provided with a washer or binding disc 32.

The control member 24 for the switch is provided with a ball-like head 33 having an enlarged transverse opening 34 for engaging loosely about a transverse pin 35 mounted in the shell. The head 33 is provided with a rounded surface 36 at one side of an intermediate removed portion 37 and is provided with a flat surface 38 at the opposite side of the removed part 37.

The switch assembly and control member thus formed are threaded into the internally threaded outer end of a narrow, elongated, hollow support 39, the flange 18 taking against the end portion of the support. The wire or lead 14 is secured to the binding post 31 and extends through the hollow support which at its other end fits removably into a socket member 40, a set screw or other device 41 being employed to hold it therein. The socket member is provided with a flange 42 having perforations 43 to receive fastening means by which the socket member may be secured to the instrument board 7, or to other part of the vehicle. The socket will be so designed as to direct the support 39 toward the steering wheel and to hold the control member 24 just beneath the steering wheel where the fingers of the operator's hand, when in the act of grasping the steering wheel, may be projected through the wheel and into operative engagement with the control member.

In operation, the control member 24 normally occupies the central, neutral or intermediate position, shown in Figure 3, in which case the removed intermediate portion 37 is opposite the exposed head of the screw 22 and the circuit is interrupted because of the insulated disc 23. If the switch is swung to either side upon the pin 35, however, the circuit will be closed by grounding through the shell and support 39. By shifting the control member 24 to the dotted line position, shown in Figure 4, the rounded or convex surface will be brought against the head of the screw 22 and due to the eccentric position, as soon as the control member is released, the coil spring 20 acting through the plunger 21 will restore the control member to the neutral position promptly interrupting the circuit. On the other hand, when the control member 24 is swung to the full line position shown in Figure 4, the flat surface 38 will be brought against the set screw 22 and the plunger and its spring will operate against this flat surface to hold the control member in the shifted position, and retain the circuit closed. At the option of the vehicle operator, the circuit may be closed and left closed for an appreciable interval of time by throwing the control member 24 to the left; or the signal may be intermittently flashed by periodically pushing the control member to the right and releasing it.

It is obvious that various changes and modifications may be made in the details of construction and design of the above specifically described embodiment of this invention without departing from the spirit thereof, such changes and modifications being restricted only by the scope of the following claim:—

What is claimed is:—

A controlling means for a vehicle signal including a switch with a pivoted operating lever, a long support for the switch having a base portion adapted for attachment to the instrument board of a motor vehicle to position the pivoted lever of the switch beneath the rim of the steering wheel of the vehicle and in proximity thereto for operation of said lever by a finger of the hand gripping the steering wheel, a spring pressed insulating plate in said support, a contact element mounted through the central portion of said plate, said operating lever having a head at its pivotal portion bearing against said insulating plate and having a flat inner end normally engaging the plate to hold the lever adjacent the rim of the steering wheel, said head having a central opening at its inner flat end normally registering with the contact element to space the head therefrom and divide the head into opposed branches, one branch of said head having a flat side to engage the insulating plate and the contact element therein to hold the lever when swung in one direction and make contact between the element and the head, the other branch of the head being rounded to return the lever to normal position when the lever is swung in an opposite direction to make a temporary contact between the head and the element, said long support being disposed on its base portion to hold the operating lever of the switch for movement in opposite directions transversely of the vehicle and in a plane intersecting the plane of the axis of the steering wheel whereby said operating lever may be moved by the natural swinging of a finger of the hand on the steering wheel into one position to give a flashing signal and into an opposite position to give a continuous signal.

In testimony whereof I affix my signature.

GEORGE E. THIMMES.